(12) United States Patent
Nagao (10) Patent No.: US 10,120,161 B2
(45) Date of Patent: Nov. 6, 2018

(54) LENS BARREL AND OPTICAL APPARATUS HAVING THE SAME

(71) Applicant: CANON KABUSHIKI KAISHA, Tokyo (JP)

(72) Inventor: Yuki Nagao, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 14/962,327

(22) Filed: Dec. 8, 2015

(65) Prior Publication Data

US 2016/0170171 A1 Jun. 16, 2016

(30) Foreign Application Priority Data

Dec. 10, 2014 (JP) ................. 2014-249780

(51) Int. Cl.
*G02B 7/10* (2006.01)
*G02B 7/04* (2006.01)
*G03B 17/04* (2006.01)

(52) U.S. Cl.
CPC ...................... *G02B 7/10* (2013.01)

(58) Field of Classification Search
CPC . G02B 7/10; G02B 7/102; G02B 7/04; G03B 17/04; G03B 17/14
USPC ....................................... 359/700
See application file for complete search history.

(56) References Cited

U.S. PATENT DOCUMENTS

| | | | |
|---|---|---|---|
| 6,778,335 B2 * | 8/2004 | Takanashi | G02B 7/10 359/704 |
| 7,027,727 B2 | 4/2006 | Nomura | |
| 7,050,244 B2 | 5/2006 | Hayashi et al. | |
| 7,050,713 B2 | 5/2006 | Nomura | |
| 7,307,803 B2 | 12/2007 | Matsumoto et al. | |
| 7,466,504 B1 * | 12/2008 | Koyama | G02B 7/102 359/819 |
| 2005/0057822 A1 | 3/2005 | Hayashi | |

(Continued)

FOREIGN PATENT DOCUMENTS

| | | |
|---|---|---|
| CN | 1485637 A | 3/2004 |
| CN | 1485673 A | 3/2004 |

(Continued)

OTHER PUBLICATIONS

Office Action issued in U.S. Appl. No. 14/962,566 dated Oct. 17, 2017.

(Continued)

*Primary Examiner* — William R Alexander
*Assistant Examiner* — Henry Duong
(74) *Attorney, Agent, or Firm* — Rossi, Kimms & McDowell LLP (57) ABSTRACT

Provided is a lens barrel which has a lens holding frame that holds a lens and has cam followers mounted on an outer circumferential portion thereof by screws and nuts and a cylinder member that has grooves into which the cam followers are fitted, and in which a position of the lens holding frame is regulated by the grooves. Holes into which the nuts are fitted and bottomed recesses with which bottoms of the cam followers come into contact are formed in places of the outer circumferential portion on which the cam followers are mounted, and axial end faces of the nuts protrude from the recesses to be fitted into inner circumferential portions of the cam followers.

11 Claims, 11 Drawing Sheets

(56) References Cited

U.S. PATENT DOCUMENTS

| | | | |
|---|---|---|---|
| 2006/0023321 A1 | 2/2006 | Wada | |
| 2008/0180812 A1* | 7/2008 | Honsho | G02B 7/102 |
| | | | 359/700 |

FOREIGN PATENT DOCUMENTS

| | | | |
|---|---|---|---|
| CN | 1637455 A | 7/2005 |
| GB | 2394560 A | 4/2004 |
| JP | 11305103 A | 11/1999 |
| JP | 2007264220 A | 10/2007 |

OTHER PUBLICATIONS

Office Action issued in Chinese Application No. 201510893834.4 dated Oct. 24, 2017. English translation provided.

\* cited by examiner

LENS BARREL AND OPTICAL APPARATUS HAVING THE SAME

BACKGROUND OF THE INVENTION

Field of the Invention

The present invention relates to a lens barrel and an optical apparatus having the same.

Description of the Related Art

A lens barrel used for an optical apparatus such as a digital camera or a video camera has a mechanism that moves lens holding members (lens holding frames) holding lens groups in a direction of an optical axis (optical axis direction of an imaging optical system) at the time of, for instance, focusing by means of rotation of a rotary cylinder (cam cylinder).

In this mechanism, the cam cylinder having cam grooves, a guide cylinder (stationary cylinder) having a longitudinal groove (rectilinear groove) parallel to the direction of the optical axis, and cam followers engaged with both types of grooves are used. The cam followers are fixed to the lens holding frames by screws, or the like. As the cam followers move in the direction of the optical axis due to rotation of the cam cylinder, the lens holding frames move in the direction of the optical axis.

To move the lens holding frames along the cam grooves with high precision, it is important to stably fix the cam followers to set positions of the lens holding frames without deviation. To prevent engagement from being released even when the optical apparatus applies an environmental change or shock or when a mass of the lens holding frames increases, an effort to increase a fixing force (e.g., to increase locking quantity) for the lens holding frames of the cam followers is required.

In contrast, Japanese Patent Laid-Open No. H11-305103 discloses a technique for using an energizing force caused by elastic deformation of a member holding cam followers when the cam followers are accurately fixed to a cam cylinder using screws and nuts.

When the locking quantity is increased to improve a fixing force of each cam follower, it is necessary to increase thicknesses of the cam followers or lens holding frames. However, in Japanese Patent Laid-Open No. H11-305103, no description is made of increasing the locking quantity to improve the fixing force.

SUMMARY OF THE INVENTION

The present invention provides a lens barrel and an optical apparatus having the same, both of which increase a fixing force of cam followers to a lens holding frame in a reduced space and are excellent in environment-resistant performance and shock-resistant performance with respect to changes in temperature and humidity.

The present invention provides a lens barrel which has a lens holding frame that holds a lens and has cam followers mounted on an outer circumferential portion by screws and nuts and a cylinder member that has grooves into which the cam followers are fitted, and in which a position of the lens holding frame is regulated by the grooves, wherein holes into which the nuts are fitted and bottomed recesses with which bottoms of the cam followers come into contact are formed in places of the outer circumferential portion on which the cam followers are mounted; and axial end faces of the nuts protrude from the recesses to be fitted into inner circumferential portions of the cam followers.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the drawings and the like. The present invention can be applied to a lens barrel of an imaging apparatus (optical apparatus) such as a lens integrated digital or video camera, but it will be described using an example of an interchangeable lens barrel.

(First Embodiment)

Figure 1:
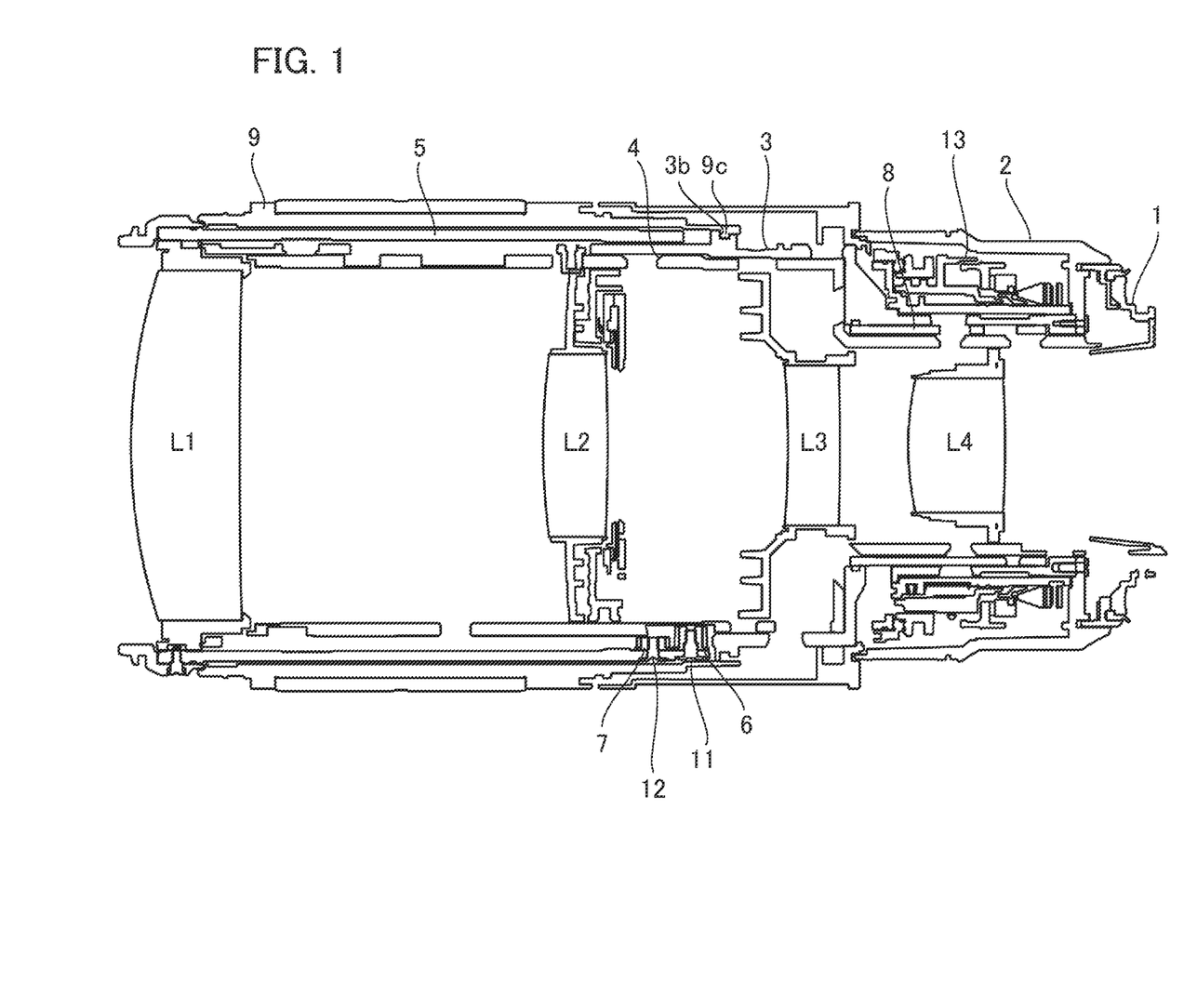
FIG. 1 is a sectional view illustrating a configuration of an interchangeable lens barrel according to a first embodiment.

FIG. 1 is a sectional view illustrating a configuration of an interchangeable lens barrel to which a lens barrel according to a first embodiment of the present invention can be applied. A first lens group L1, a second lens group L2, a third lens group L3, and a fourth lens group L4 constituting an imaging optical system are held in the lens barrel illustrated in FIG. 1. Further, this lens barrel has a mount 1, a lens holding frame 5, a base cylinder (cylinder member) 2, a guide cylinder (stationary cylinder) 3, a cam cylinder (rotary cylinder) 4, and a focus driving cylinder 8, a zooming ring 9, and a focus motor unit 13.

The first, second and third lens groups L1, L2 and L3 move in a direction of an optical axis and change a magnification, and the fourth lens group L4 moves in the direction of the optical axis and adjusts a focus. The guide cylinder 3 is fixed to the base cylinder 2 in the direction of the optical axis and a circumferential direction centering on the optical axis. The cam cylinder 4 is disposed on an inner circumference of the guide cylinder 3, and is held to be rotatable in the circumferential direction relative to the guide cylinder 3 so as not to move in the direction of the optical axis by a bayonet mechanism (not illustrated). The lens holding frame 5 is located on an outer circumference of the guide cylinder 3, and holds the first lens group L1. Cam followers 6 and 7 are mounted on the lens holding frame 5 by screws (fastening members) 11 and 12, respectively. The cam follower 7 is mounted in a pair with the cam follower 6 at a position (adjacent or neighboring position) aligned in the direction of the optical axis with respect to the cam follower 6. The focus driving cylinder 8 is provided with driving grooves extending in the direction of the optical axis with three phases at regular intervals in the circumferential direction thereof. The zooming ring 9 is mounted on a circumference located farther outward than the lens holding frame 5, and is mounted on the outer circumference of the guide cylinder 3 to be rotatable in the circumferential direction relative to the guide cylinder 3. A bayonet claw 9c of the zooming ring 9 and a circumferential rectilinear groove 3b provided in the guide cylinder 3 are bayonet-coupled. Thereby, the zooming ring 9 is allowed to rotate at a predetermined amount of rotation in a circumferential direction while movement in the direction of the optical axis relative to the guide cylinder 3 is obstructed, and is held on the guide cylinder 3. An output key (not illustrated) of the focus motor unit 13 is engaged with a part of the focus driving cylinder 8.

Figure 2:
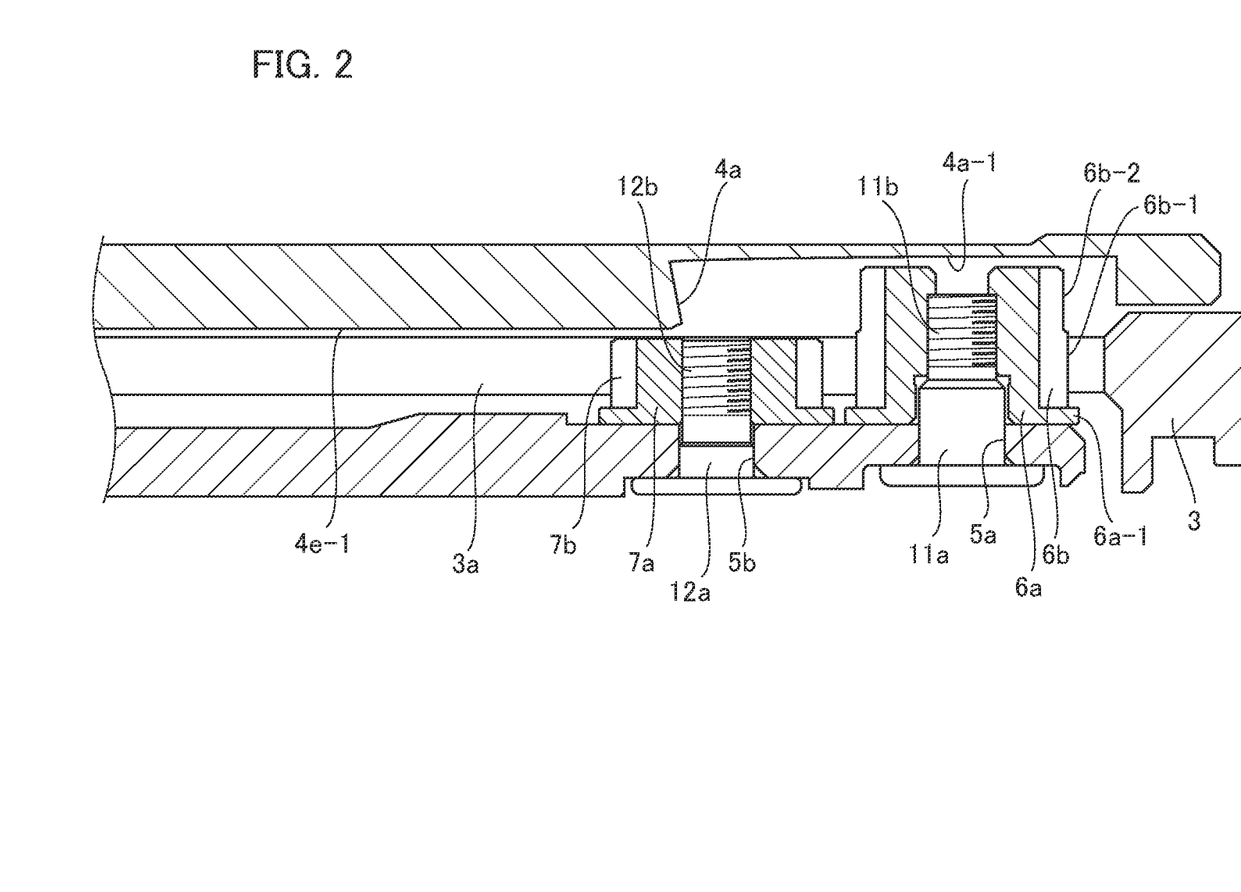
FIG. 2 is a partial enlarged view of the lens barrel illustrated in FIG. 1.

FIG. 2 is a sectional view of mounting portions of the cam followers 6 and 7 for the lens holding frame 5, the guide cylinder 3, and the cam cylinder 4 which are illustrated in FIG. 1. First, a configuration in which the first to fourth lens groups are held and movement of each lens group will be described using this figure. The guide cylinder 3 is provided with rectilinear grooves 3a, 3b and 3c (but the rectilinear grooves 3b and 3c are not illustrated) for guiding the first to third lens groups L1 to L3 in the direction of the optical axis, respectively. The rectilinear grooves 3a, 3b and 3c are provided in the guide cylinder 3 with three phases each (a total of nine phases) at regular intervals in the circumferential direction centering on the optical axis. The cam cylinder 4 is provided with cam grooves 4a, 4b, 4c and 4d (though the cam grooves 4b, 4c and 4d are not illustrated) for moving the respective first to fourth lens groups L1 to L4 in the direction of the optical axis by means of rotation thereof. The cam grooves 4a, 4b, 4c and 4d are provided in the cam cylinder 4 with three phases each (a total of 12 phases) at regular intervals in the circumferential direction. The cam groove 4a is formed as a bottomed cam groove having a bottom portion 4a-1.

Figure 3:
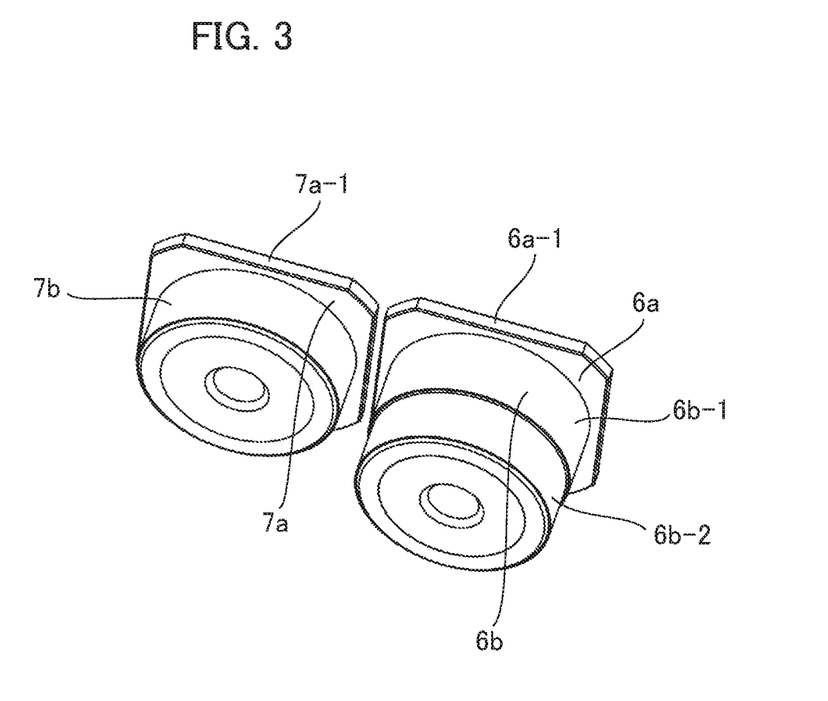
FIG. 3 is a view illustrating cam followers used in the lens barrel according to the first embodiment.

The cam followers 6 and 7 are configured as in a schematic view illustrated in FIG. 3. The cam follower 6 is made up of a core member 6a formed of a metal, and a collar portion 6b that is disposed on an outer circumference of the core member 6a and is formed of a resin. The core member 6a is equipped with a flange portion 6a-1, and the collar portion 6b is equipped with first and second outer circumferential portions 6b-1 and 6b-2 having different diameters. Similarly, the cam follower 7 is made up of a core member 7a formed of a metal, and a collar portion 7b formed of a resin. The core member 7a is equipped with a flange portion 7a-1.

The cam follower 6 is engaged with the rectilinear groove 3a of the guide cylinder 3 and the cam groove 4a of the cam cylinder 4. The cam follower 7 is engaged with the rectilinear groove 3a of the guide cylinder 3. With this configuration, the first lens group L1 is movable in the direction of the optical axis relative to the guide cylinder 3, and is held to be nonrotatable in the circumferential direction. The cam followers 6 and 7 are mounted on the guide cylinder 3 in pairs with three phases at regular intervals in the circumferential direction.

Further, although not illustrated in FIG. 2, the second and third lens groups L2 and L3 are disposed on an inner circumference of the cam cylinder 4. Each cam follower provided for the lens holding frame of the second lens group L2 is engaged with the rectilinear groove 3b of the guide cylinder 3 and the cam groove 4b of the cam cylinder 4. Each cam follower provided for the lens holding frame of the third lens group L3 is engaged with the rectilinear groove 3c of the guide cylinder 3 and the cam groove 4c of the cam cylinder 4. With this configuration, the second and third lens groups L2 and L3 are movable in the direction of the optical axis relative to the guide cylinder 3, and are held to be nonrotatable in the circumferential direction. Thus, each cam follower provided for the lens holding frame of the fourth lens group L4 is engaged with the driving groove of the focus driving cylinder 8 and the cam groove 4d of the cam cylinder 4. For this reason, when the focus driving cylinder 8 is rotated in the circumferential direction by the focus motor unit 13, the fourth lens group L4 is displaced in the direction of the optical axis by a lift of the cam groove 4d while being rotated in the circumferential direction by the driving groove of the focus driving cylinder 8.

Next, a mounting structure in which the cam followers 6 and 7 are mounted on the lens holding frame 5 will be described based on FIG. 2. The first outer circumferential portion 6b-1 of the cam follower 6 is engaged with the rectilinear groove 3a of the guide cylinder 3, and the second outer circumferential portion 6b-2 is engaged with the cam groove 4a of the cam cylinder 4. An outer diameter of the second outer circumferential portion 6b-2 is set to be slightly smaller than that of the first outer circumferential portion 6b-1. The flange portion 6a-1 comes into contact with a seat face of the lens holding frame 5, and a male thread portion 11b of a shaft portion 11a of a screw 11 inserted into a hole 5a of the lens holding frame 5 and female threads of an inner circumference of the core member 6a are screwed together. Thereby, the cam follower 6 is mounted on the lens holding frame 5. On the other hand, the collar portion 7b of the cam follower 7 is engaged with the rectilinear groove 3a of the guide cylinder 3. The flange portion 7a-1 comes into contact with the seat face of the lens holding frame 5, and a male thread portion 12b of a shaft portion 12a of a screw 12 inserted into a hole 5b of the lens holding frame 5 and female threads of an inner circumference of the core member 7a are screwed together. Thereby, the cam follower 7 is mounted on the lens holding frame 5.

Figure 4A:
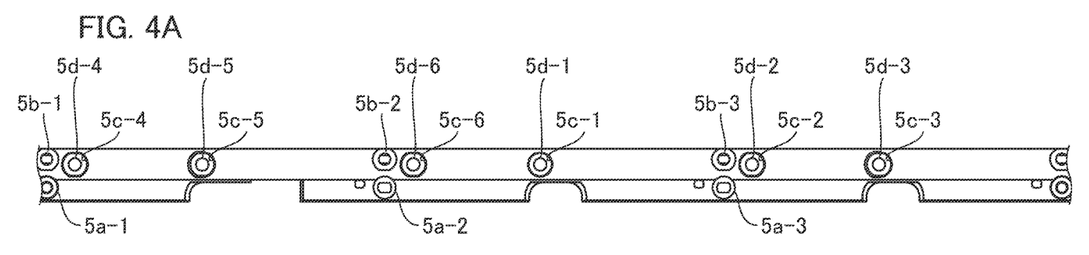
FIG. 4A is a view illustrating a lens holding frame in the lens barrel according to the first embodiment.
Figure 4B:
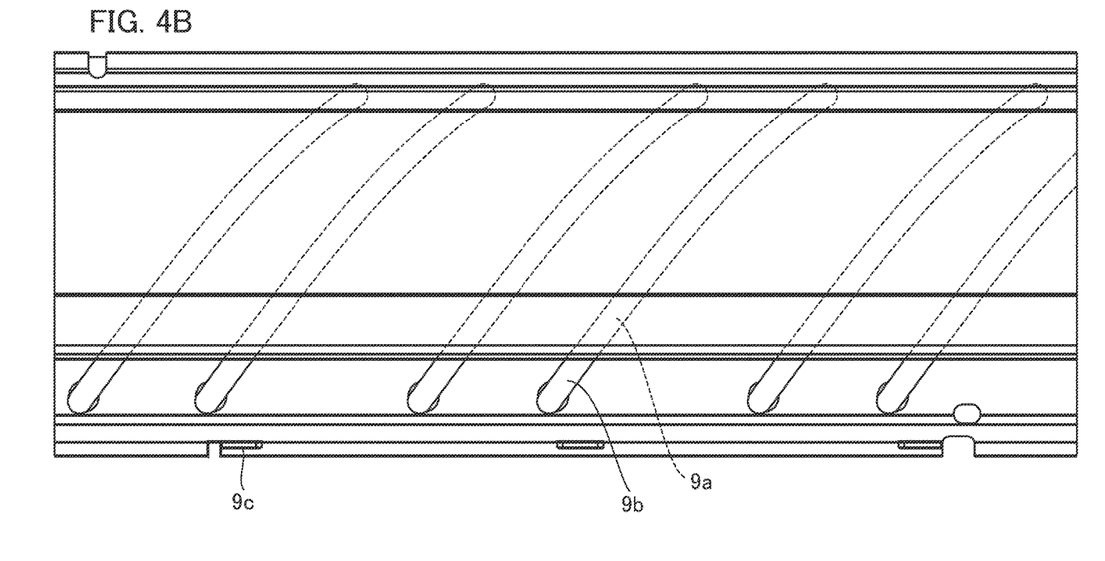
FIG. 4B is a development view of a zooming ring in the lens barrel according to the first embodiment.
Figure 5:
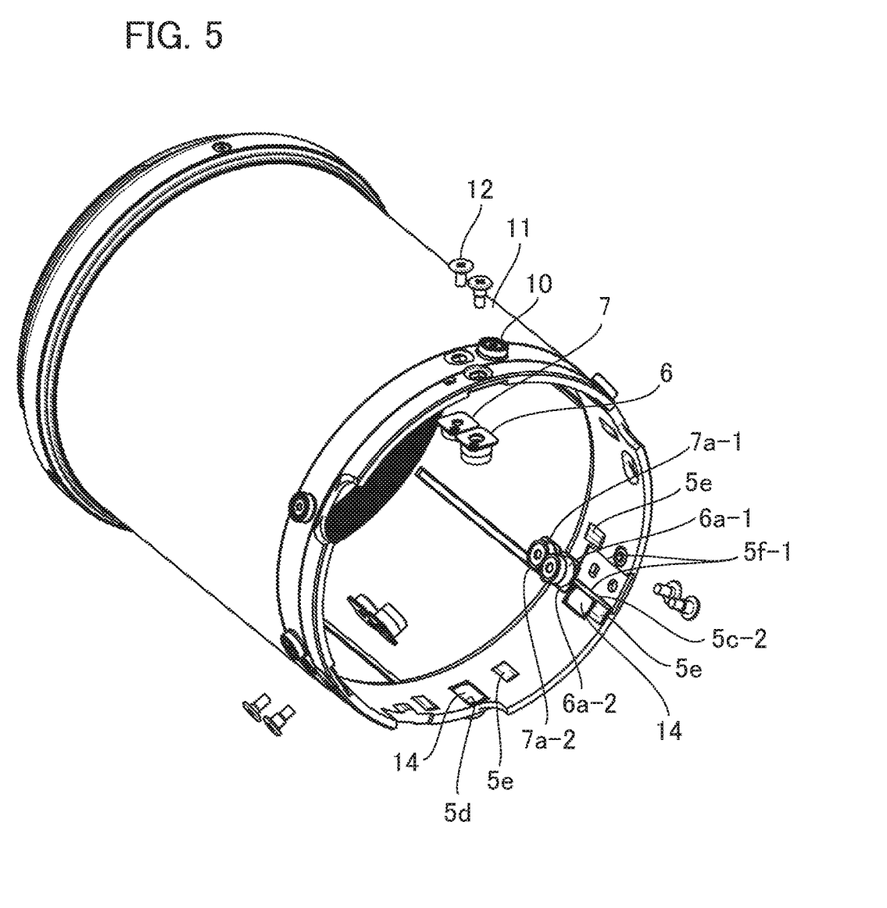
FIG. 5 is an exploded perspective view illustrating a relation between the lens holding frame and the cam follower according to the first embodiment.

Engagement of the lens holding frame 5 and the zooming ring 9 will be described using FIGS. 4 and 5. FIG. 4A is a view in which the lens holding frame 5 is extended in the circumferential direction, and FIG. 4B is a view in which the zooming ring 9 is extended in the circumferential direction. FIG. 5 illustrates a state in which the cam followers 6, 7 and 10 are mounted on the lens holding frame 5. As illustrated in FIG. 4B, the zooming ring 9 has cam grooves 9a provided in an inner circumference thereof with six respective phases in the circumferential direction, and through portions 9b are provided at rear ends (image side ends) of the cam grooves 9a. The six cam followers 10 provided on an outer circumferential surface of the lens holding frame 5 illustrated in FIG. 5 are engaged with the respective cam grooves 9a. With this configuration, a user turns the zooming ring 9, and thereby the first to fourth lens groups L1 to L4 move in the direction of the optical axis to change a magnification. Also, the focus motor unit 13 is driven, and thereby the fourth lens group L4 moves in the direction of the optical axis while rotating in the circumferential direction, and focusing is performed.

Positional adjustment of the cam followers 6, 7 and 10 will be described based on FIGS. 4A and 5. As illustrated in FIG. 4A, the lens holding frame 5 is provided with holes 5a-1, 5a-2 and 5a-3 that are disposed in three phases in the circumferential direction. The cam follower 6 disposed in a first phase among the cam followers 6 disposed in the three phases is mounted in the hole 5a-1 by the screw 11. The hole 5a-1 is formed as a circular hole, an inner diameter of which is equal to an outer diameter of the shaft portion 11a of the screw 11 (diameter relation in which it is in a fitted state or in a lightly press-fitted state). Thus, the shaft portion 11a of the screw 11 is fitted (or lightly press-fitted) into the hole 5a-1. Thereby, the cam follower 6 disposed in the first phase is hindered from being displaced relative to the lens holding frame 5 in the direction of the optical axis and in the circumferential direction, and is positioned in these directions.

On the other hand, the cam followers 6 disposed in the second and third phases are mounted in the holes 5a-2 and 5a-3 by the screws 11. The holes 5a-2 and 5a-3 are formed as long holes, widths of which in the direction of the optical axis are equal to the outer diameter of the shaft portion 11a of the screw 11 (diameter relation in which it is in a fitted state or in a lightly press-fitted state), and widths of which in the circumferential direction are greater than the outer diameter of the shaft portion 11a. Thus, the shaft portion 11a of the screw 11 is fitted into the hole 5a-2 or 5a-3, and thereby the cam followers 6 disposed in the second and third phases are positioned for the lens holding frame 5 in the direction of the optical axis. On the other hand, before the screws 11 are tightened, the displacement of the cam followers 6 in the circumferential direction is allowed, and position adjustment of the cam followers 6 in the circumferential direction is possible.

Likewise, the cam followers 7, each of which forms a pair with the cam follower 6, are mounted in the holes 5b-1, 5b-2 and 5b-3 disposed in the three phases in the circumferential direction by the screws 12. The holes 5b-1, 5b-2 and 5b-3 are formed as long holes, widths of which in the direction of the optical axis are equal to an outer diameter of the shaft portion 12a of the screw 12 (diameter relation in which it is in a fitted state or in a lightly press-fitted state), and widths of which in the circumferential direction are greater than the outer diameter of the shaft portion 12a. Thus, the shaft portions 12a of the screws 12 are fitted into the holes 5b-1, 5b-2 and 5b-3, and thereby the cam followers 7 are positioned for the lens holding frame 5 in the direction of the optical axis. On the other hand, before the screws 12 are tightened, displacement of the cam followers 7 in the circumferential direction is allowed, and position adjustment of the cam followers 7 in the circumferential direction is possible.

Figure 9A:
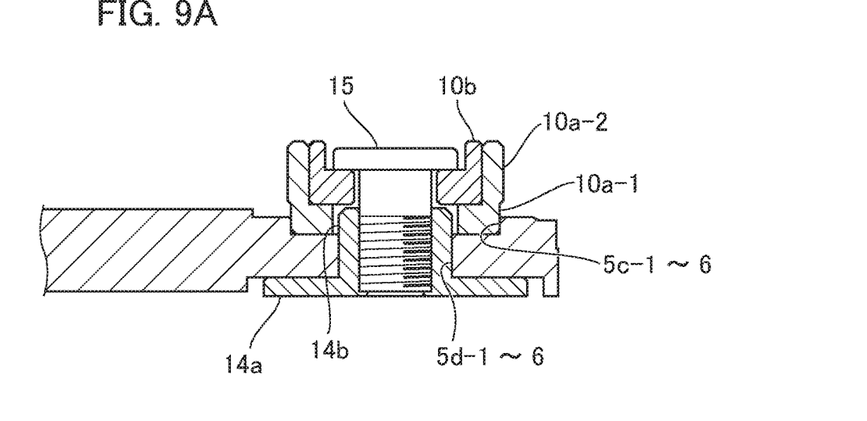
FIG. 9A is a sectional view illustrating a configuration and fixing method of the cam follower according to the first embodiment.
Figure 9B:
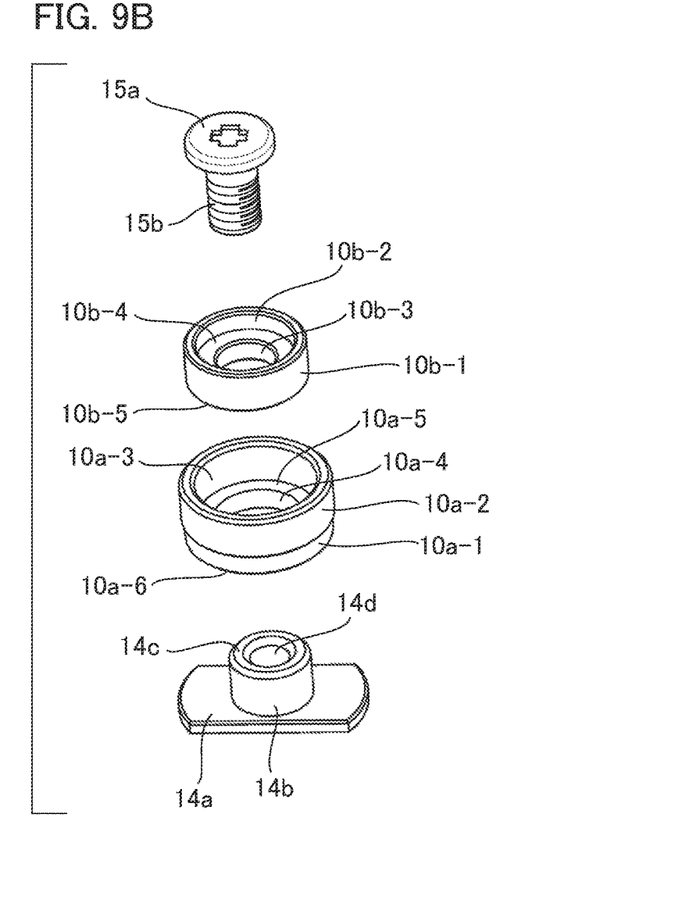
FIG. 9B is an exploded view illustrating the configuration and fixing method of the cam follower according to the first embodiment.

A configuration of the cam follower 10 will be described based on FIGS. 9A and 9B. FIG. 9A is a sectional view taken parallel to the optical axis in a state in which the cam followers 10 are mounted in recesses 5c-1 to 5c-6 provided in the lens holding frame 5. FIG. 9B illustrates configurations of a screw 15, a nut 14, and the cam follower 10. As illustrated in FIG. 9A, the cam follower 10 is made up of a core member 10b formed of a metal, and a collar portion that is disposed on an outer circumference of the core member 10b and is formed of a resin. This collar portion is provided with first and second outer circumferential portions 10a-1 and 10a-2. Further, as illustrated in FIG. 9B, the core member 10b is provided with an outer circumferential portion 10b-1, a first inner circumferential portion 10b-2, a second inner circumferential portion 10b-3, a seat face 10b-4, and a bottom 10b-5. The collar portion is also provided with a first inner circumferential portion 10a-3, a second inner circumferential portion 10a-4, and a seat face 10a-5.

The outer circumferential portion 10b-1 and the first inner circumferential portion 10a-3 have almost the same diameter. When the collar portion and the core member 10b are combined, the outer circumferential portion 10b-1 and the inner circumferential portion 10a-3 are adapted to be fitted. The first inner circumferential portion 10b-2 has a greater diameter than a head portion 15a of the screw 15, and the second inner circumferential portion 10b-3 has a greater diameter than an outer diameter of a shaft portion 15b having male threads of the screw 15. The seat face 10b-4 is a face with which the head portion 15a of the screw 15 comes into contact, and the bottom 10b-5 is in contact with the seat face 10a-5. The first outer circumferential portion 10a-1 provides a mounting position of the cam follower 10 for the lens holding frame 5. The second outer circumferential portion 10a-2 is fitted into the cam groove 9a of the zooming ring 9, and drives the lens holding frame 5 along the cam. The second inner circumferential portion 10a-4 has a diameter greater than an outer diameter of a shaft portion 14b of the nut 14.

As illustrated in FIG. 4A, the lens holding frame 5 is provided with the recesses 5c-1 to 5c-6 in which the cam followers 10 are housed and holes 5d-1 to 5d-6 at six places thereof in the circumferential direction. Among these, the recess 5c-1 is formed as a circular recess, an inner diameter of which is equal to that of the first outer circumferential portion 10a-1 of the cam follower 10 (diameter relation in which it is in a fitted state). On the other hand, the recesses 5c-2 to 5c-6 are formed as elliptical recesses, widths of which in the direction of the optical axis are equal to that of the first outer circumferential portion 10a-1 of the cam follower 10 (diameter relation in which it is in a fitted state), and widths of which in the circumferential direction are greater than that of the first outer circumferential portion 10a-1 of the cam follower 10. Therefore, when the shaft portion 14b is inserted into the hole 5d-1 and the cam follower 10 is disposed in the recess 5c-1 from an outer circumference side through the through portion 9 and is mounted by the screw 15, the cam follower 10 is positioned for the lens holding frame 5 in the direction of the optical axis and in the circumferential direction. In contrast, when the cam followers 10 are similarly disposed in the recesses 5c-2 to 5c-6, the cam followers 10 are positioned for the lens holding frame 5 in the direction of the optical axis, whereas position adjustment of the cam followers 10 in the circumferential direction is possible before the screws 15 are tightened.

Figure 6:
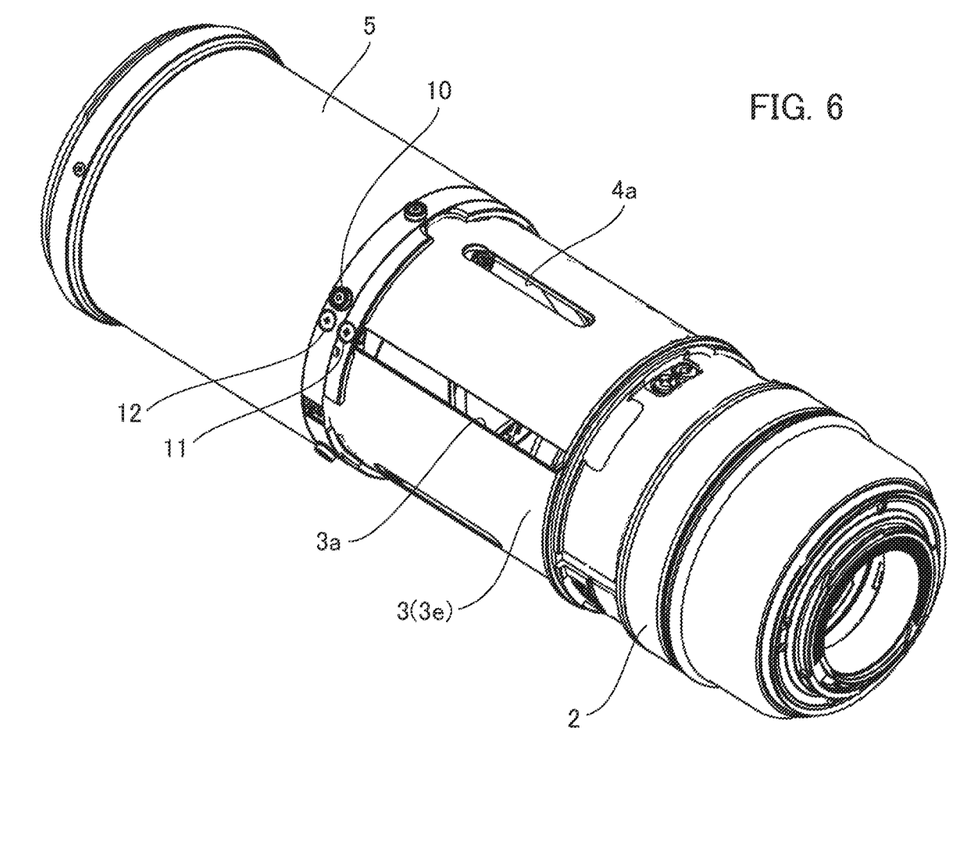
FIG. 6 is a perspective view illustrating major components of the lens barrel according to the first embodiment.
Figure 7:
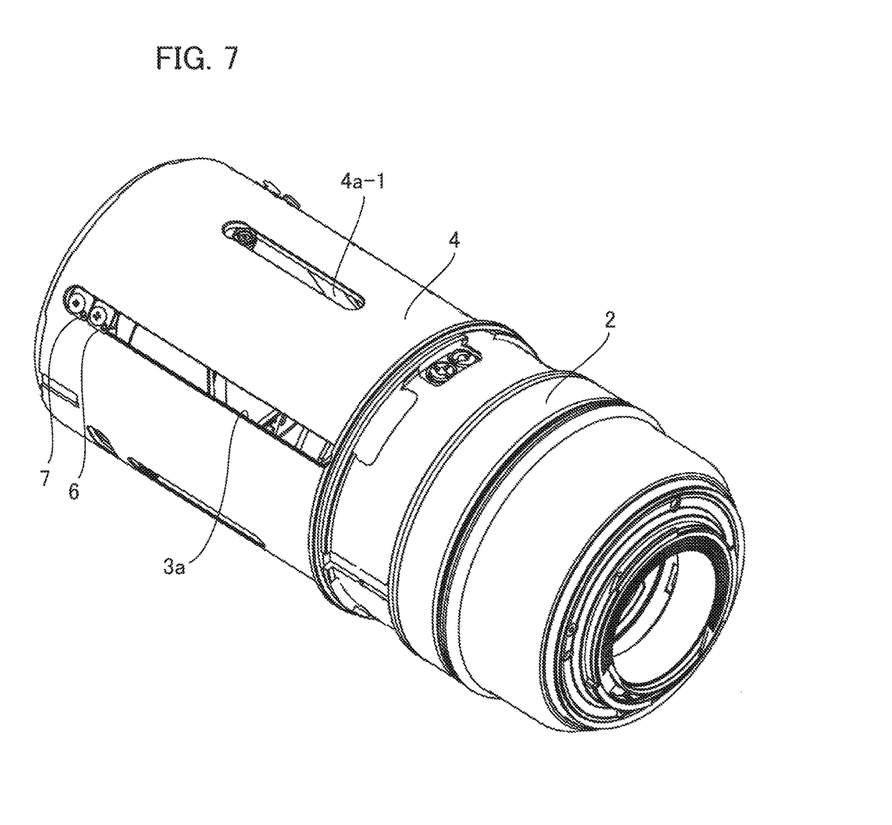
FIG. 7 is a perspective view illustrating major components of the lens barrel according to the first embodiment.
Figure 8:
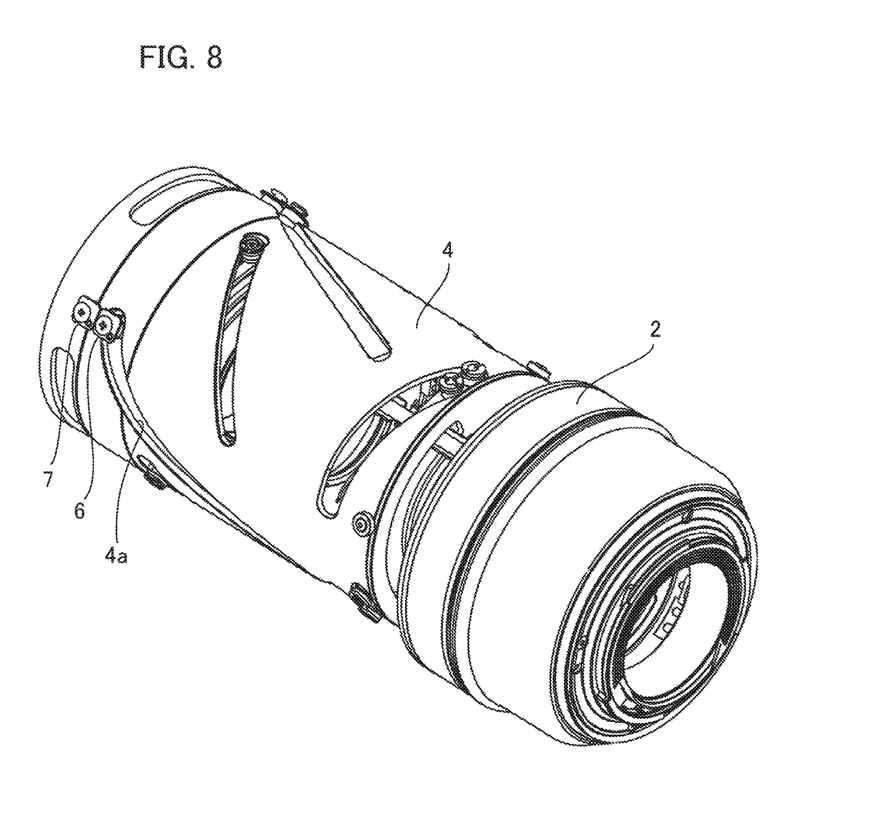
FIG. 8 is a perspective view illustrating major components of the lens barrel according to the first embodiment.

FIG. 6 illustrates a state in which the lens holding frame 5 is assembled with the guide cylinder 3. FIG. 7 illustrates a configuration in which only the lens holding frame 5 is omitted from FIG. 6, and FIG. 8 illustrates a configuration in which the guide cylinder 3 is omitted from FIG. 7. As illustrated in FIG. 7, before the lens holding frame 5 is assembled, the cam followers 6 and 7 are set in all of the three phases. The setting mentioned here involves insertion of the cam followers 6 at the intersections of the rectilinear grooves 3a with the cam grooves 4a and insertion of the cam followers 7 into the rectilinear grooves 3a. At this time, as illustrated in FIG. 2, the cam grooves 4a are formed as bottomed grooves having bottoms 4a-1 in the vicinity of the inner circumference of the cam cylinder 4, and the cam followers 6 do not fall into the cam cylinder 4. Also, the cam followers 7 are inserted into positions at which the cam grooves 4a are not present. However, although the cam followers 7 are deeply inserted into the cam grooves 4a, the cam followers 7 butt into an outer surface 4e-1 of the cam cylinder 4. Thus, the cam followers 7 do not fall into the cam cylinder 4. At this time, the collar portions 6b and 7b of the cam followers 6 and 7 preferably have outer diameters that are slightly greater than the widths of the rectilinear grooves 3a or the cam grooves 4a. This contributes to improvement of holding accuracy in the optical system, and exhibits an effect in which it is easy to hold the cam followers temporarily even during assembly.

After the cam followers 6 and 7 are set in the three phases, the lens holding frame 5 is inserted from an image side toward the guide cylinder 3, and the cam followers 6 come to a stop at positions at which they can be fixed by the screws 11. At this time, the cam followers 6 and 7 located at the positions of the holes 5a-1 and 5b-1 of the lens holding frame 5 illustrated in FIG. 4A are first fixed by the respective screws 11 and 12. Next, the cam followers 6 located at the positions of the holes 5a-2 and 5a-3 are fixed by the screws 11. Subsequently, the cam followers 7 located at the positions of the holes 5b-1 to 5b-3 are fixed by the screws 12.

When the cam followers 6 and 7 are mounted on the lens holding frame 5, it is important to align cylinder central axes of the lens holding frame 5 and the guide cylinder 3 and to hold the lens holding frame 5 and the guide cylinder 3. To this end, the lens holding frame 5 and the guide cylinder 3 may be held at positions at which the cylinder central axes thereof are aligned by a tool made with high precision, or may be set to have diameters such that the lens holding frame 5 and the guide cylinder 3 are fitted. For example, as in FIG. 5, there is a method in which a plurality of fitting protrusions 5e are provided at a plurality of places on the inner circumference of the lens holding frame 5 in the circumferential direction, and the cam followers 6 and 7 are screwed after the fitting protrusions 5e and the outer circumferential surface 3e of the guide cylinder 3 are fitted.

Even if there are production errors in the three rectilinear grooves 3a or the three cam grooves 4a, since the holes 5a-2 and 5a-3 have the shapes of long holes that extend in the circumferential direction, the cam followers 6 are ultimately fixed at the intersections of the rectilinear grooves 3a with the cam grooves 4a in all of the three phases. In addition, when the cam followers 7 are screwed into the holes 5b-1 to 5b-3, since the holes 5b-1 to 5b-3 also have the shapes of long holes that extend in the circumferential direction, the cam followers 7 can be fixed at positions corresponding to the holes even if there are production errors in the three rectilinear grooves 3a.

When fixedly screwed, the cam followers 6 are adapted to rotate relative to the lens holding frame 5 along with the screws 11. At this time, since the flange portions 6a-1 of the cam, followers 6 have rectangular shapes, the flange portions 6a-1 hit inner surfaces 5f-1 to 5f-3 (the inner surfaces 5f-2 and 5f-3 are not illustrated) enclosing the seat faces of the lens holding frame 5 illustrated in FIG. 5, and thereby the rotation of the cam followers 6 stops. This is similarly applied to the cam followers 7. When fixedly screwed, the cam followers 7 are adapted to rotate relative to the lens holding frame 5 along with the screws 12. At this time, since the flange portions 7a-1 of the cam followers 7 have a rectangular shape, the flange portions 7a-1 hit inner surfaces 5f-1 to 5f-3 (the inner surfaces 5f-2 and 5f-3 are not illustrated) enclosing the seat faces of the lens holding frame 5 illustrated in FIG. 5, and thereby the rotation of the cam followers 7 stops.

Each of the collar portions 6b and 7b of the cam followers 6 and 7 has a cylindrical shape. For this reason, although the cam followers 6 and 7 rotate about the central axes of the collar portion 6b and 7b along with the screws 11 and when fixedly screwed, a contact relation between the rectilinear grooves 3a and cam grooves 4a and the collar portion 6b and 7b is not changed.

In the present embodiment, although the flange portions 6a-1 and 7a-1 of the cam followers 6 and 7 are rotated about the central axes of the collar portions 6b and 7b, they have a symmetrical shape. For this reason, when the cam followers 6 and 7 are mounted on the lens holding frame 5, there is no need to consider directions of the cam followers 6 and 7.

According to the configuration of, for instance, the hole 5a-1 provided in the lens holding frame 5 as described above, even if there are production errors in the components such as the cam followers 6, 7 and 10, the lens holding frame 5, the rectilinear grooves 3a, and the cam grooves 4a, it is possible to provide the lens barrel without impairing an operational feeling.

Figure 10A:
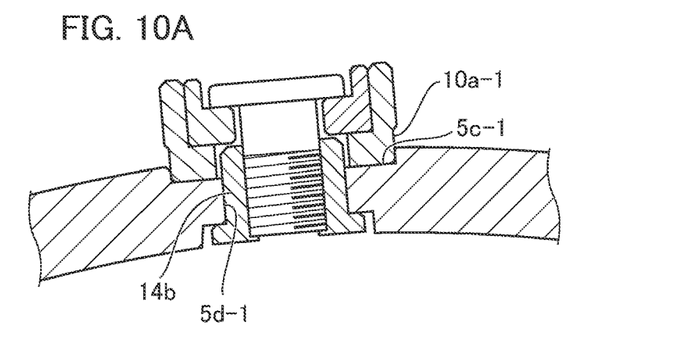
FIG. 10A is another sectional view illustrating the configuration and fixing method of the cam follower according to the first embodiment.
Figure 10B:
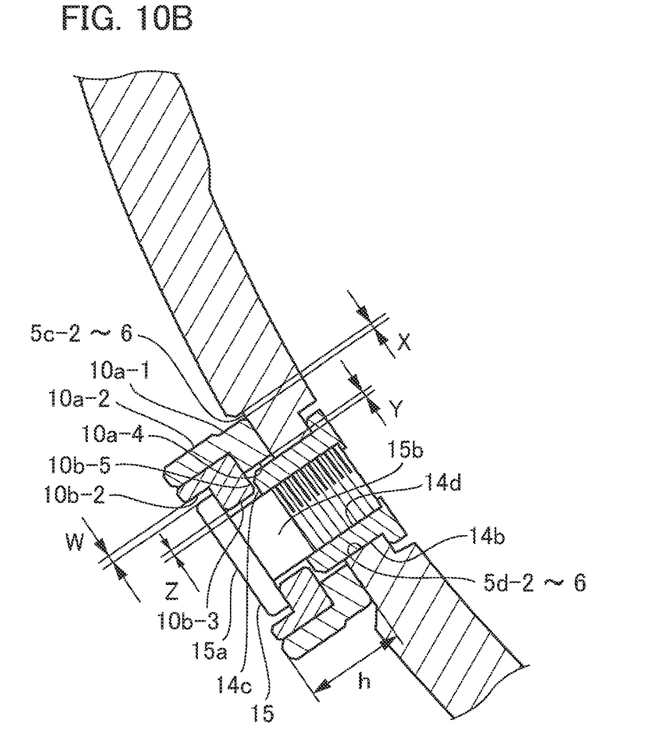
FIG. 10B is another sectional view illustrating a configuration and fixing method of the cam follower according to the first embodiment.
Figure 11:
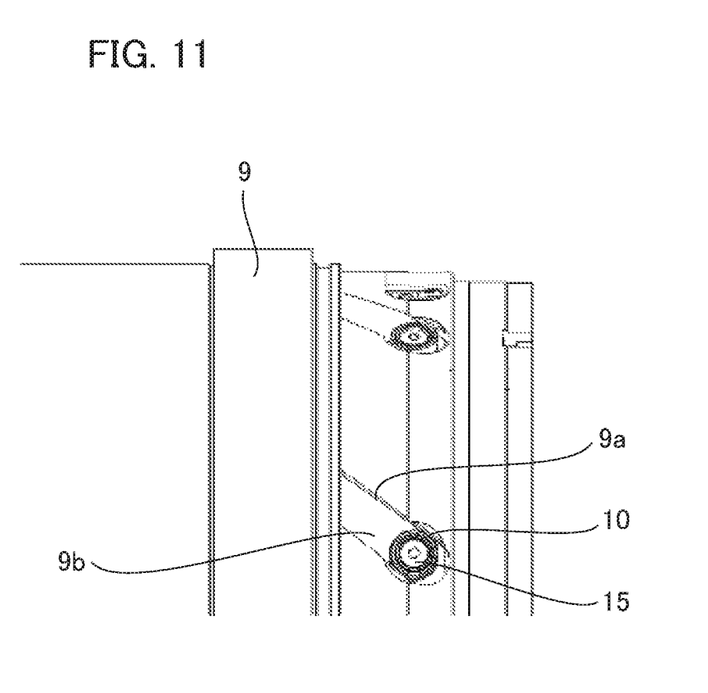
FIG. 11 is a perspective view illustrating a state after the cam follower according to the first embodiment is fixed.

Next, mounting of the cam followers 10 on the lens holding frame 5 will be described in detail based on FIGS. 9A, 9B, 10A, 10B and 11. FIG. 10A illustrates a state in which the cam follower 10 is mounted in the recess 5c-1 of the lens holding frame 5 illustrated in FIG. 4. FIG. 10B illustrates a state in which the cam follower 10 is mounted in the recess 5c-2 to 5c-6 of the lens holding frame 5 illustrated in FIG. 4. Both of FIGS. 10A and 10B illustrate a cross section perpendicular to the optical axis. FIG. 11 is a perspective view when the cam follower 10 is mounted on the lens holding frame 5 via the through portion 9b of the zooming ring 9 in the assembly process.

As illustrated in FIG. 10A, the shaft portion 14b is inserted into the hole 5d-1, and the cam follower equipped with the first outer circumferential portion 10a-1 is disposed in the recess 5c-1. Thus, when mounted by the screw 15, the cam follower 10 is positioned toward the lens holding frame 5 in the direction of the optical axis and in the circumferential direction. As described above, the recess 5c-1 is formed as the circular recess, the inner diameter of which is equal to that of the first outer circumferential portion 10a-1 (diameter relation in which it is in the fitted state).

FIG. 10B is a view illustrating a state in which the shaft portions 14b are inserted into each of the holes 5d-2 to 5d-6 and the cam follower equipped with the first outer circumferential portion 10a-1 is mounted on each of the recesses 5c-2 to 5c-6 by the screw 15.

As illustrated in FIG. 10B, there is a clearance Y between the second inner circumferential portion 10a-4 (third inner circumferential surface of the cam follower 10) and the shaft portion 14b. Thereby, an axial end face 14c of the nut 14 can further protrude from each of the recesses 5c-2 to 5c-6. The axial end face 14c of the nut 14 is stretched to a position at which a slight clearance from the bottom 10b-5 is secured, and a height of the shaft portion 14b of the nut 14 can be increased compared to the case in which the shaft portion 14b does not protrude from the bottom of the recess 5c of the lens holding frame 5. As a result, it is possible to increase a thread effective length of the female thread portion 14d. When the effective length of the female thread portion 14d can be increased, a long shaft portion can be used as the shaft portion 15b having the male threads, and a locking quantity of the screw can be increased. This configuration does not unnecessarily increase a height h of the cam follower or a thickness of the lens holding frame 5. Here, a locking quantity of the screw is an overlap amount of the screw threads and the nut threads when viewed from the axial direction of the screw (size, length of the radial direction of the screw)

According to this configuration, it is possible to provide the lens barrel in which a fixing force of the cam followers to the lens holding frame is increased in a reduced space and environment-resistant and shock-resistant performance with respect to changes in temperature and humidity is excellent.

As illustrated in FIG. 10B, the recesses 5c-2 to 5c-6 are formed as elliptical recesses, widths of which in the direction of the optical axis are equal to that of the first outer circumferential portion 10a-1 (diameter relation in which they are in the fitted state), but widths of which in the circumferential direction are greater than that of the first outer circumferential portion 10a-1. Accordingly, the cam follower has a clearance X in the circumferential direction of the lens holding frame 5.

Also, there is a clearance Z between the second inner circumferential portion 10b-3 of the core member 10b (second inner circumferential surface of the cam follower 10) and the shaft portion 15b having the male threads of the screw 15, and there is a clearance W between the first inner circumferential portion 10b-2 of the core member 10b (firs inner circumferential surface of the cam follower 10) and the outer diameter of the head portion 15a of the screw 15.

According to the configuration having the clearances W, X, Y and Z between the respective inner circumferential portions (inner circumferential surfaces) and the respective portions in this way, it is possible to provide the lens barrel in which, even when there are assembly errors in the cam followers 10, an operational feeling is not impaired.

Here, an axis tilt when a magnification is changed will be described. The zooming ring 9 is held coaxially with the guide cylinder 3. Also, an axis tilt of the zooming ring 9 to the guide cylinder 3 depends on a relation between the bayonet claw 9c of the zooming ring 9 and the rectilinear groove 3b of the guide cylinder 3. Further, an axis tilt of the lens holding frame 5 to the guide cylinder 3 depends on the mounted state of the cam followers 6 when the lens holding frame 5 and the guide cylinder 3 are assembled. For this reason, an axis tilt between the zooming ring 9 and the lens holding frame 5 is slightly different in each lens barrel depending on component accuracy or assembly accuracy.

Even in the aforementioned state, first, the screwing is performed from hole 5c-1, and thereby a positional relation between the zooming ring 9 and the lens holding frame 5 in the circumferential direction and a positional relation between the zooming ring 9 and the lens holding frame 5 in the direction of the optical axis are determined. Afterwards, the cam followers 10 are screwed into the recesses 5c-2 to 5c-6. Thereby, the zooming ring 9 and the lens holding frame 5 are coupled in a state in which a previously regulated axis tilt between the zooming ring 9 and the lens holding frame 5 is maintained.

The configuration having the clearances W, X, Y and Z described above also contributes to an assembly state in which the axis tilt of the lens holding frame 5 is not greatly changed when the magnification is changed.

A magnitude relation among the clearances W, X, Y and Z is set in such a manner that the clearance X is smallest. For this reason, although the cam follower 10 is displaced and combined within a range of an amount of adjustment X in the circumferential direction of the lens holding frame 5, places in which the clearances W, Y and Z are secured do not have zero clearance, and cause no interference.

Also, it does not matter whether the outer diameter of the head portion 15a of the screw 15 is greater or smaller than that of the second inner circumferential portion 10a-4 of the cam follower 10. However, if it is small, it is necessary to increase rigidity such that the of the core member 10b is not deformed by fastening of the screw 15.

In the present embodiment, it has been described that the collar portion of the cam follower is formed of a resin and the core member is formed of a metal. This is because, if the collar portion is formed of a resin having a good sliding characteristic, a cam face and a resin face slide, and friction can be reduced. Also, if the core member is formed of a metal, it is possible to have an effect of reinforcing the collar portion formed of a resin with the internal core member. Thereby, for example, when a shock is applied from the outside, the collar portion formed of a resin is hardly deformed. Also, the collar portion and the core member do not necessarily have to be separate components, and may be formed of one material such as a metal or a high-strength resin material and be assembled as the cam follower. This is a method of forming the collar portion and the core member in one body. However, the collar portion and the core member may be formed in one body by insert molding, or formed by cutting work and combined.

It has been described above and illustrated in FIGS. 9B and 10B that the central axes of the diameters of the first and second outer circumferential portions 10a-1 and 10a-2 of the cam follower 10 are the same axis. However, the central axes are not necessarily the same axis, and may be eccentric axes. In that case, by mounting and rotating the cam follower 10, it is possible to intentionally tilt the member on which the cam follower 10 is mounted, or to cause the member on which the cam follower 10 is mounted to be eccentric. This is effective when there is a need to perform optical adjustment, for instance, correct a slight tilt or eccentricity of the lens group.

In the present embodiment, it has been described that the six cam followers 10 are fixed in the circumferential direction of the lens holding frame 5 and drive the lens holding frame 5. However, the number of cam followers need not be six, and the present invention can be applied as long as there are three or more cam followers.

Also, in the present embodiment, the case in which the second outer circumferential portions 10a-2 of the cam followers 10 are fitted into the cam grooves 9a of the zooming ring 9 and the lens holding frame 5 on which the cam followers 10 are mounted is driven in the direction of the optical axis has been described by way of example. However, the other sides into which the second outer circumferential portions 10a-2 of the cam followers 10 are fitted are holes or grooves provided, for instance, in the stationary cylinder fixed, for instance, to the mount, or structures that are held as a group in which the second outer circumferential portions are fitted and not driven. The present invention is applicable in this case as well.

While exemplary embodiment of the present invention has been described, the present invention is not limited to this embodiment, and various modifications or alterations are possible within the gist of the present invention.

This application claims the benefit of Japanese Patent Application No. 2014-249780 filed Dec. 10, 2014, which is hereby incorporated by reference herein in its entirety.

What is claimed is:

1. A lens barrel comprising:
a lens holding frame that holds a lens;

screws and nuts;
cam followers each mounted on an outer circumferential portion of the lens holding frame with one of the screws and one of the nuts; and
a cylindrical ring member having grooves into which the cam followers are disposed, and regulate a position of the lens holding frame,
wherein the lens holding frame includes holes that receive the nuts and recesses that seat bottoms of the cam followers, and
wherein axial end faces of the nuts protrude beyond bottoms of the recesses.

2. The lens barrel according to claim 1, wherein:
a clearance in the axial direction of the nut is present between the axial end face of the nut protruding from the recess and the cam follower,
each of the screws has a head portion and a shaft portion,
each of the cam followers includes first, second and third inner circumferential surfaces,
a clearance is present between the first inner circumferential surface and the head portion of the screw,
a clearance is present between the second inner circumferential surface and the shaft portion of the screw,
a clearance is present between the third inner circumferential surface and an outer diameter of the axial end face of the nut protruding from the recess, and
a clearance is present between an outer circumferential portion of the cam follower and the recess in a circumferential direction of the lens barrel.

3. The lens barrel according to claim 1, wherein:
each of the screws has a head portion,
each of the cam followers has a core member, which has a seat face and a bottom, and a collar portion, which has a seat face and a bottom, covering an outer circumference of the core member and slidable along the groove,
the seat face of the core member comes into contact with the head portion of the screw,
the bottom of the core member comes into contact with the seat face of the collar portion and
the bottom of the collar portion and the recess come into contact with each other.

4. The lens barrel according to claim 3, wherein:
each of the collar portions of the cam followers is formed of a resin, and
each of the core members is composed of a material having higher rigidity than the collar portion.

5. The lens barrel according to claim 1, wherein:
the cam followers are mounted on the outer circumferential portion of the lens holding frame in a plurality of phases,
one of the plurality of phases has the hole having a circular shape whose inner diameter is disposed in an outer circumferential portion of the cam follower, and
another phase among the plurality of phases has the hole having a shape of a long hole that extends in the circumferential direction of the outer circumferential portion, and whose widths in the direction of an optical axis are disposed in the outer circumferential portion of the cam follower.

6. The lens barrel according to claim 1, wherein the recesses are recessed inward toward the lens from an outer circumferential surface of the lens holding frame.

7. The lens barrel according to claim 1, wherein the recesses each are configured to position each of the cam followers in a direction of an optical axis.

8. The lens barrel according to claim 1, wherein the cam follower contacts with the bottoms of the recesses in an outside of outer circumferential portions of the nuts.

9. The lens barrel according to claim 1, wherein the axial end faces of the nuts extend outward farther than an outer circumferential surface of the lens holding frame.

10. An optical apparatus having a lens barrel including:
a lens barrel; and
an image pickup device configured to receive light from the lens barrel,
wherein the lens barrel includes:
a lens holding frame that holds a lens;
screws and nuts;
cam followers each mounted on an outer circumferential portion of the lens holding frame with one of the screws and one of the nuts; and
a cylindrical ring member having grooves into which the cam followers are disposed, and regulate a position of the lens holding frame,
wherein the lens holding frame includes holes that receive the nuts and recesses that seat bottoms of the cam followers, and
wherein axial end faces of the nuts protrude beyond bottoms of the recesses.

11. A lens barrel comprising:
a lens holding frame that holds a lens;
screws;
cam followers each mounted on an outer circumferential portion of the lens holding frame with one of the screws; and
a cylindrical ring member having grooves into which the cam followers are disposed, and regulate a position of the lens holding frame,
wherein the lens holding frame includes:
an axial portion protruding to an outside in a radial direction of the lens and including a female thread portion; and
recesses that seat bottoms of the cam followers, the recesses being recessed inward toward the lens from an outer circumferential surface of the lens holding frame, and
wherein an axial end face portion of the axial portion protrudes outwardly beyond a bottom of the recess.

* * * * *